Sept. 30, 1969   HIROSHI AISO ET AL   3,469,939
PROCESS FOR MANUFACTURING HYDROGEN FLUORIDE
Filed July 5, 1967
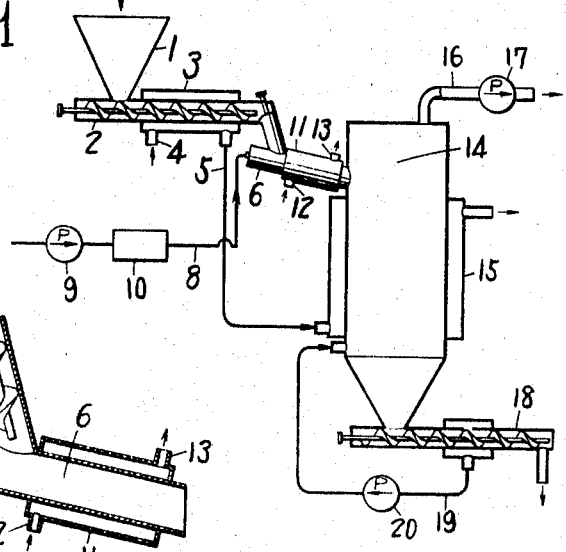
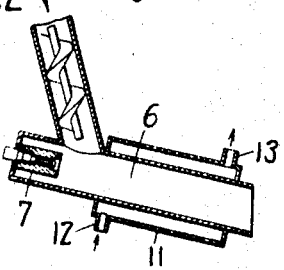
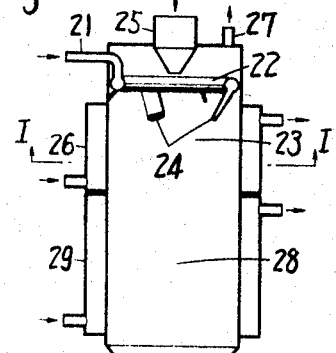
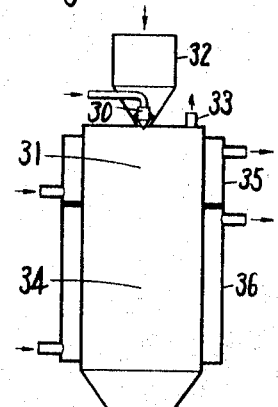
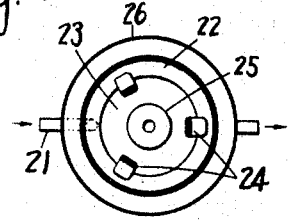
INVENTORS
HIROSHI AISO
SHUNICHI NOMURA
TOSHINOBU TAKEUCHI
BY
Bailey, Stephens & Huettig
ATTORNEYS United States Patent Office 3,469,939
Patented Sept. 30, 1969

3,469,939
PROCESS FOR MANUFACTURING
HYDROGEN FLUORIDE
Hiroshi Aiso, Osaka-fu, Shunichi Nomura, Kyoto-shi, and Toshinobu Takeuchi, Osaka-fu, Japan, assignors to Daikin Kogyo Kabushiki Kaisha, Osaka-shi, Japan
Filed July 5, 1967, Ser. No. 651,273
Claims priority, application Japan, July 8, 1966, 41/44,643
Int. Cl. C01b 7/22
U.S. Cl. 23—153                    8 Claims

ABSTRACT OF THE DISCLOSURE

In manufacturing hydrogen fluoride by reaction of fluorspar with sulfuric acid a process comprises contacting at 150 to 300° C. particulate fluorspar with sulfuric acid by continuously introducing the preheated particulate fluorspar into reaction zone and spraying the preheated sulfuric acid to the reaction zone in at least stoichiometric amount for the reaction with the fluorspar to effect the reaction of the sulfuric acid and fluorspar to produce hydrogen fluoride and calcium sulfate and separating evolved hydrogen fluoride from calcium sulfate.

---

This invention relates to the manufacture of hydrogen fluoride and more particularly to a new and improved continuous process for the production of hydrogen fluoride by reaction of fluorspar with sulfuric acid.

It is well known in the art that hydrogen fluoride is manufactured by the reaction of fluorspar with sulfuric acid. However, prior processes usually require for the reaction a relatively long period and a considerably large scale of apparatus, such as rotary kilns, and further undesired hard lumps are formed during the reaction, thus decreasing the efficiency of heat and the capacity of the apparatus. To prevent such formation of the hard lumps, in U.S. Patent No. 3,160,473, there is disclosed that the fluorspar calcined at 425 to 705° C. is reacted in rotary kilns with sulfuric acid to produce hydrogen fluoride. However, it is essential to use large scale apparatus not only for the reaction but also for the calcination of the fluorspar, and large amount of heat is required for the calcination.

In U.S. Patent No. 3,207,579 is disclosed that mixture of fluorspar and sulfuric acid is discharged to fluidized bed of particulate calcium sulfate at 100 to 400° C. to produce hydrogen fluoride. As can be appreciated the wear of the apparatus due to violent collision of the solid particles fluidized and heated at such high temperature is considerable, large amount of heat is required for fluidization of the particles and further the produced hydrogen fluoride gas is contaminated with hot gas for fluidization, especially carbon dioxide or hydrogen, and with fine solid particles being accompanied with the hot gas, thus necessitating complicated purification procedures.

It is one object of the invention to provide a process for manufacturing hydrogen fluoride by reaction of fluorspar and sulfuric acid with high efficiency of heat and apparatus.

Another object of the invention is to provide a process for reacting fluorspar with sulfuric acid to produce hydrogen fluoride in a markedly reduced volume of apparatus.

Further object of the invention is to provide a process for reacting fluorspar with sulfuric acid to produce hydrogen fluoride without using a large amount of heat as required in the prior art.

Further object of the invention is to provide a process for reacting fluorspar with sulfuric acid to produce hydrogen fluoride within markedly reduced reaction period.

A still further object of the invention is to provide a process for manufacturing hydrogen fluoride by reaction of fluorspar and sulfuric acid, in which the resultant hydrogen, fluoride can be separated easily from the byproduced calcium sulfate.

The above and other objects of the invention will be apparent from the following description.

According to the present invention the process for manufacturing hydrogen fluoride comprises contacting at 150 to 300° C. particulate fluorspar with sulfuric acid by continuously introducing the preheated particulate fluorspar into reaction zone and spraying the preheated liquid sulfuric acid to the reaction zone in at least stoichiometric amount for reaction with the fluorspar to effect the reaction of the sulfuric acid and fluorspar to produce hydrogen fluoride and calcium sulfate and separating evolved hydrogen fluoride from calcium sulfate.

This invention is based on the discovery that when particulate fluorspar is contacted with sulfuric acid at 150 to 300° C. by continuously introducing the preheated particulate fluorspar in to reaction zone and spraying the preheated sulfuric acid to the reaction zone and eruptive reaction occurs immediately between sulfuric acid and fluorspar, producing immense volume of gaseous hydrogen fluoride whereby fluorspar is thoroughly mixed with sulfuric acid to rapidly complete the reaction and at the same time the produced calcium sulfate crystallizes into dry porous grains, thus making it possible to manufacture hydrogen fluoride not being contaminated with the byproduced calcium sulfate dust, from fluorspar and sulfuric acid with a small apparatus in a short length of time by high efficiency of heat. In fact, according to the invention, the reaction between fluorspar and sulfuric acid takes place immediately and is substantially completed only within 60 seconds, generally within 30 seconds, producing hydrogen fluoride in an amount almost corresponding to the theoretical one, and the byproduced calcium sulfate rapidly crystallizes within said reaction time to form porous grains.

The particulate fluorspar to be used in the invention is desired to be of minute particle size, generally particles all passing 20-mesh Tyler screen may be used, desirable being those all passing through 200 mesh. According to the invention, fluorspar and sulfuric acid are respectively preheated before being placed in the reaction zone, where said preheating temperatures may be determined so as to attain the reaction temperature of 150–300° C. when both materials are brought into contact with each other for the reaction. Generally it is desirable to preheat fluorspar at 300 to 420° C. preferably 340 to 400° C., and sulfuric acid at 80–150° C., preferably 100 to 120° C. The amount of sulfuric acid to be used should be at least a stoichiometric amout relative to fluorspar, generally less than 20% in excess of the stoichiometric amount.

Sulfuric acid having a concentration of about 95 to 100%, preferably 98 to 100%, is sprayed to the reaction zone to contact with the particulate fluorspar which is continuously introduced to the reaction zone in the predetermined amount. One of the desirable methods is to spray or jet sulfuric acid over the continuous flow of particulate fluorspar. The direction and velocity of spraying sulfuric acid can be freely selected according to the particle size and the speed of supply of fluorspar, shape and size of reactor used and other factors.

The reaction temperature should be between 150° C. and 300° C., preferably between 200 and 300° C. Such reaction temperature is desirably brought about by said preheating of the fluorspar and sulfuric acid, but where required the reaction zone may be indirectly heated by suitable means, such as hot gases, electric means, etc.

The invention will be described and may be further understood with reference to the accompanying drawings given for illustrative purposes only and not to be taken as limitative.

FIGURE 1 diagrammatically shows one preferred method of carrying out the present invention.

FIGURE 2 is an enlarged section of the reactor used in the apparatus shown in FIGURE 1.

FIGURE 3 shows a section of another desirable reactor used in the invention.

FIGURE 4 is a sectional view taken substantially along line I—I of FIGURE 3.

FIGURE 5 shows a section of still another reactor used in the invention.

Referring now to FIGURE 1 and FIGURE 2 of the drawings, fluorspar from the feed hopper 1 is continuously charged to a screw-conveyor type weigh feeder 2 provided with a jacket 3 through which hot gasses circulate, entering through a line 4 and discharging through a line 5. The fluorspar charged in the weigh feeder 2 is preheated by the hot gasses to the predetermined temperature ranging from 300–420° C. and delivered continuously at a controlled rate to a reactor 6 provided with a nozzle 7 for spraying liquid sulfuric acid and made of anticorrosive materials to hydrogen fluoride and sulfuric acid. The sulfuric acid is introduced into the nozzle 7 through a line 8 provided with a pump 9 and heater 10 in which sulfuric acid is preheated to the predetermined temperature, 80–150° C., and sprayed from the nozzle 7 into the reactor 6. Thus the fluorspar continuously charged in the reaction zone is contacted with the sprayed sulfuric acid. By preheating the fluorspar and sulfuric acid to the predetermined temperatures, the temperature of the reaction mixture attains to 150–300° C. suitable for the reaction. However, if necessary, it is also possible to heat the mixture by introducing hot gas into a jacket 11 of the reactor 6 through a line 12 and discharging it through a line 13. Thus the fluorspar is reacted with the sulfuric acid instantly to generate gaseous hydrogen fluoride and produce solid calcium sulfate. The generated hydrogen fluoride gas accelerates the homogeneous mixing of the particulate fluorspar with the sulfuric acid whereby the reaction can be completed substantially within a markedly reduced period, i.e., less than 60 seconds. The produced calcium sulfate also crystalizes or solidifies immediately to form dried porous grains without the production of hard lumps. The resultant gaseous hydrogen fluoride and grains are delivered to a separator 14 provided with a jacket 15 for heating. The hydrogen fluoride gas is taken out from a line 16 provided with a pump 17 and the calcium sulfate grains fall down in the separator by their own weight. During their falling the grains are heated by hot gases passing through the jacket 15 and the residual hydrogen fluoride contained therein is evolved and taken out from the line 16. The fallen grains are discharged into a screw discharger 18 and the residual hydrogen fluoride contained in the grains is removed completely through a line 19 by a pump 20 and introduced into the separator 14 to accelerate removal of the residual hydrogen fluoride contained in the grains which fall down in the separator. Thus calcium sulfate free from hydrogen fluoride is discharged from the discharger 18.

In FIGURE 3 and FIGURE 5 reactor and separator are combined into one unit. In FIGURE 3 and FIGURE 4 sulfuric acid preheated by the same way as illustrated in FIGURE 1 is introduced via a line 21 into a pipe ring 22 for jetting sulfuric acid. Said pipe ring 22 is installed at upper portion of reactor 23 and provided with plural nozzles 24 to jet sulfuric acid downward and inward, and sulfuric acid passing to said pipe 22 is sprayed from the nozzles 24 downward and inward. The particulate fluorspar introduced via the weigh feeder and preheater (not shown) same as in FIGURE 1 is continuously charged in controlled amount from hopper 25 through the center of said ring 22 into the reactor 23 which is surrounded with a jacket 26 for heating. Thus the particulate fluorspar is contacted with the sprayed sulfuric acid, and the eruptive reaction same as illustrated with FIGURE 1 takes place. The produced hydrogen fluoride is recovered from a line 27 with a pump (not shown). The solidified calcium sulfate grains fall by their own weight through the reactor 23 into a separator 28 which is surrounded with a jacket 29 for heating, and is taken out from the discharger (not shown) same as in FIGURE 1 after the residual hydrogen fluoride being recovered by the manner as in the case of FIGURE 1.

The apparatus of FIGURE 5 is so constructed that sulfuric acid preheated by the same means as in FIGURE 1 is sprayed downward from a nozzle 30 into a reactor 31 and by virtue of jet flow thus produced, fluorspar preheated by the same means as in FIGURE 1 is quantitatively drawn out into the reactor 31 through a hopper 32. Thus the fluorspar is contacted with the sprayed sulfuric acid and the eruptive reaction same as illustrated with FIGURE 1 takes place. Hydrogen fluoride so produced is drawn out through a line 33 and the by-produced calcium sulfate is fallen to a separator 34 and discharged from discharger (not shown) by the same manner as illustrated in FIGURE 1. The reactor 31 and separator 34 are surrounded with jackets 35 and 36 for heating respectively.

For fuller understanding of the invention examples are given below.

Example 1

In this example was used the apparatus shown in FIGURE 1. Fluorspar ground to 95%—200 mesh size and containing 98 wt. percent of $CaF_2$ was fed to a screw-conveyor type weigh feeder, preheated at 330° C. and charged in a regulated amount of 60 kg./hr. to a stainless-steel reactor having a diameter of 30 mm. and length of 100 mm. 98% sulfuric acid preheated at 120° C. was sprayed from a nozzle into the reactor in a regulated amount of 85 kg./hr. Thus the fluorspar was contacted with the sprayed sulfuric acid and the temperature of the mixture was 230° C. The reaction between fluorspar and sulfuric acid takes place immediately and gaseous hydrogen fluoride and solidified grains of calcium sulfate were produced. The resultant hydrogen fluoride and calcium sulfate were delivered in a separator having a diameter of 1 m. and a height of 3 m. which was heated at about 200° C. The hydrogen fluoride gas was taken out from the separator in an amount of 30.1 kg./hr. The purity of the crude hydrogen fluoride was 98.0% and conversion of $CaF_2$ was 96.0%. The calcium sulfate was discharged from the separator, which contained no hydrogen fluoride. In this procedure calcium sulfate delivered into the separator was discharged from a discharger in 3 minutes.

Example 2

In the same manner as in Example 1, 60 kg./hr. of ground fluorspar (all of the particles passing through 200 mesh screen) preheated at 370° C. was contacted with 83 kg./hr. of sulfuric acid preheated at 105° C., and reacted at a 250° C. temperature of the reaction mixture. Thus hydrogen fluoride was obtained in 30.3 kg./hr. The purity of crude hydrogen fluoride was 97.0% and conversion of $CaF_2$ was 95.5%.

What we claim is:

1. A process for manufacturing hydrogen fluoride, which comprises contacting at 150 to 300° C. particulate fluorspar with sulfuric acid to produce hydrogen fluoride and calcium sulfate by continuously introducing particulate fluorspar preheated at 300 to 420° C. into a reaction zone and continuously spraying at least stoichiometric amounts of liquid sulfuric acid preheated at 80 to 150° C. on the continuous flow of the particulate fluorspar falling through the reaction zone and separating evolved hydrogen fluoride from said calcium sulfate.

2. The process for manufacturing hydrogen fluoride according to claim 1, in which said fluorspar is preheated at 340 to 400° C. and said sulfuric acid is preheated at 100 to 120° C.

3. The process for manufacturing hydrogen fluoride according to claim 1, in which said particulate fluorspar in particles all passing through a 20-mesh Tyler screen.

4. The process for manufacturing hydrogen fluoride according to claim 1, in which said particulate fluorspar is particles all passing through a 200-mesh Tyler screen.

5. The process for manufacturing hydrogen fluoride according to claim 1, in which said temperature of the reaction mixture is at 200 to 300° C.

6. The process for manufacturing hydrogen fluoride according to claim 1, in which the produced calcium sulfate grains fall in separating zone by their own weight and hydrogen fluoride contained therein is evolved during their falling and taken out from the separating zone.

7. The process for manufacturing hydrogen fluoride according to claim 1, in which said reaction zone is not heated externally.

8. A process for manufacturing hydrogen fluoride, which comprises contacting particulate fluorspar with sulfuric acid at 150 to 300° C. to produce hydrogen fluoride and calcium sulfate by continuously introducing particulate fluorspar preheated at 300 to 420° C. into a reaction zone and continuously spraying at least a stoichiometric amount of liquid sulfuric acid preheated at 80 to 150° C. on the continuous flow of the particulate fluorspar falling through the reaction zone, separating hydrogen fluoride evolved by said contact reaction and allowing the calcium sulfate grains produced to fall through a heated separating zone to separate hydrogen fluoride contained therein during their falling.

References Cited

UNITED STATES PATENTS

| 1,748,735 | 2/1930 | Scott | 23—153 |
| 1,812,770 | 6/1931 | Bishop | 23—153 |
| 2,047,210 | 7/1936 | Lawrence | 23—153 |
| 3,024,123 | 3/1962 | Theilacker et al. | 23—153 XR |
| 3,102,787 | 9/1963 | McMillan et al. | 23—153 |
| 3,160,473 | 12/1964 | Hayworth et al. | 23—153 |
| 3,282,644 | 11/1966 | Quarles | 23—153 |

EDWARD STERN, Primary Examiner

U.S. Cl. X.R.

23—122